Patented Feb. 6, 1934

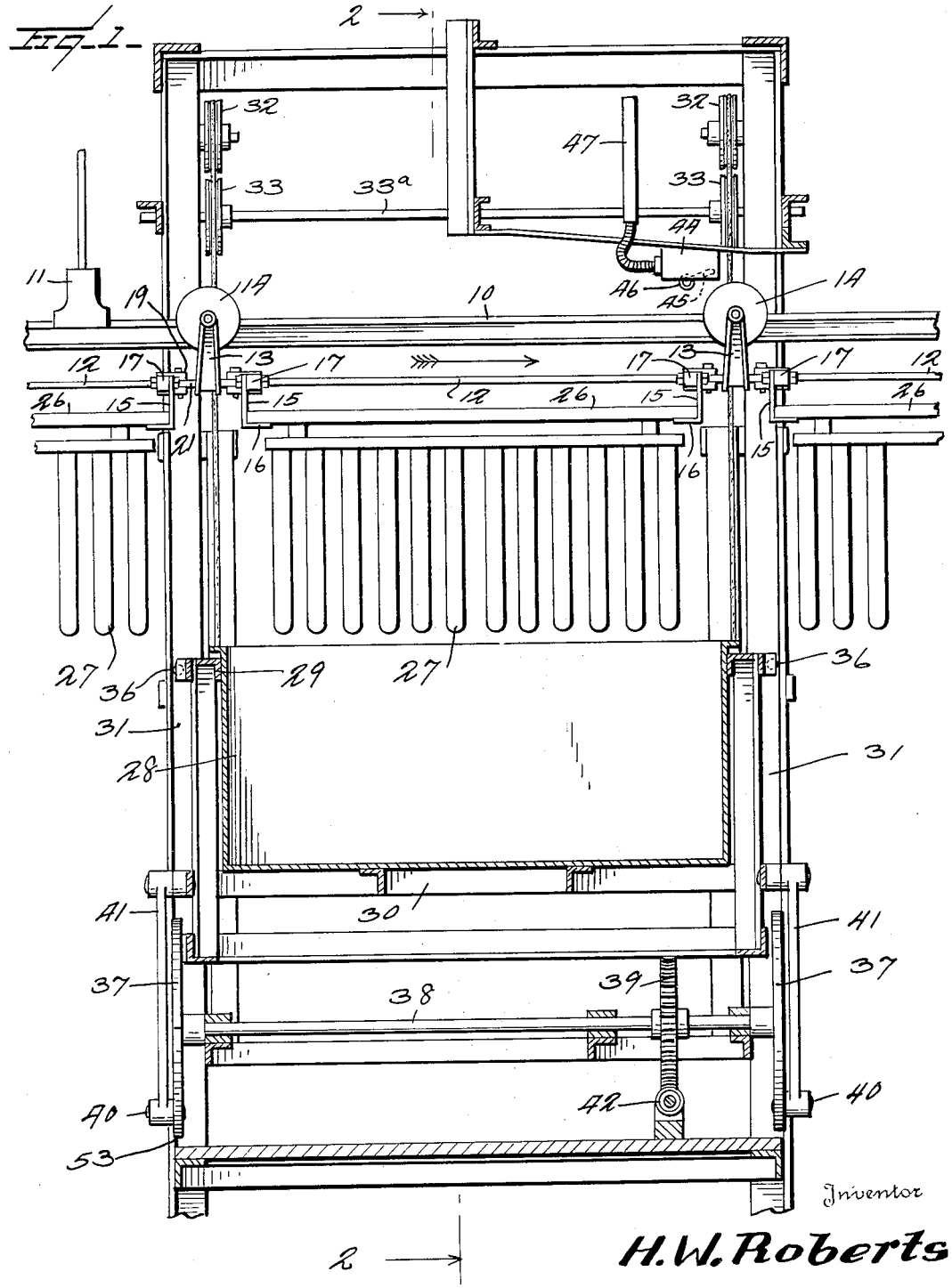

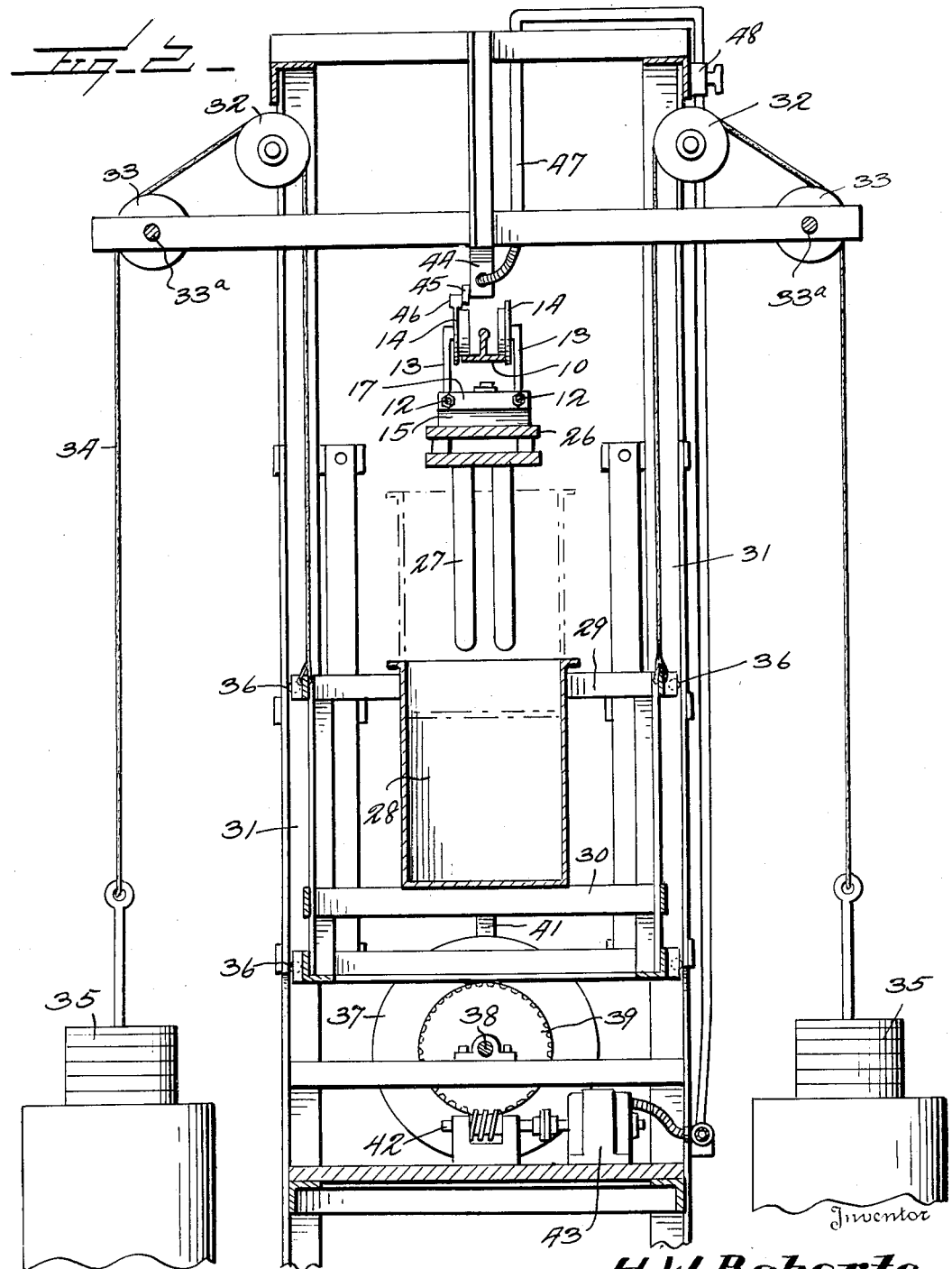

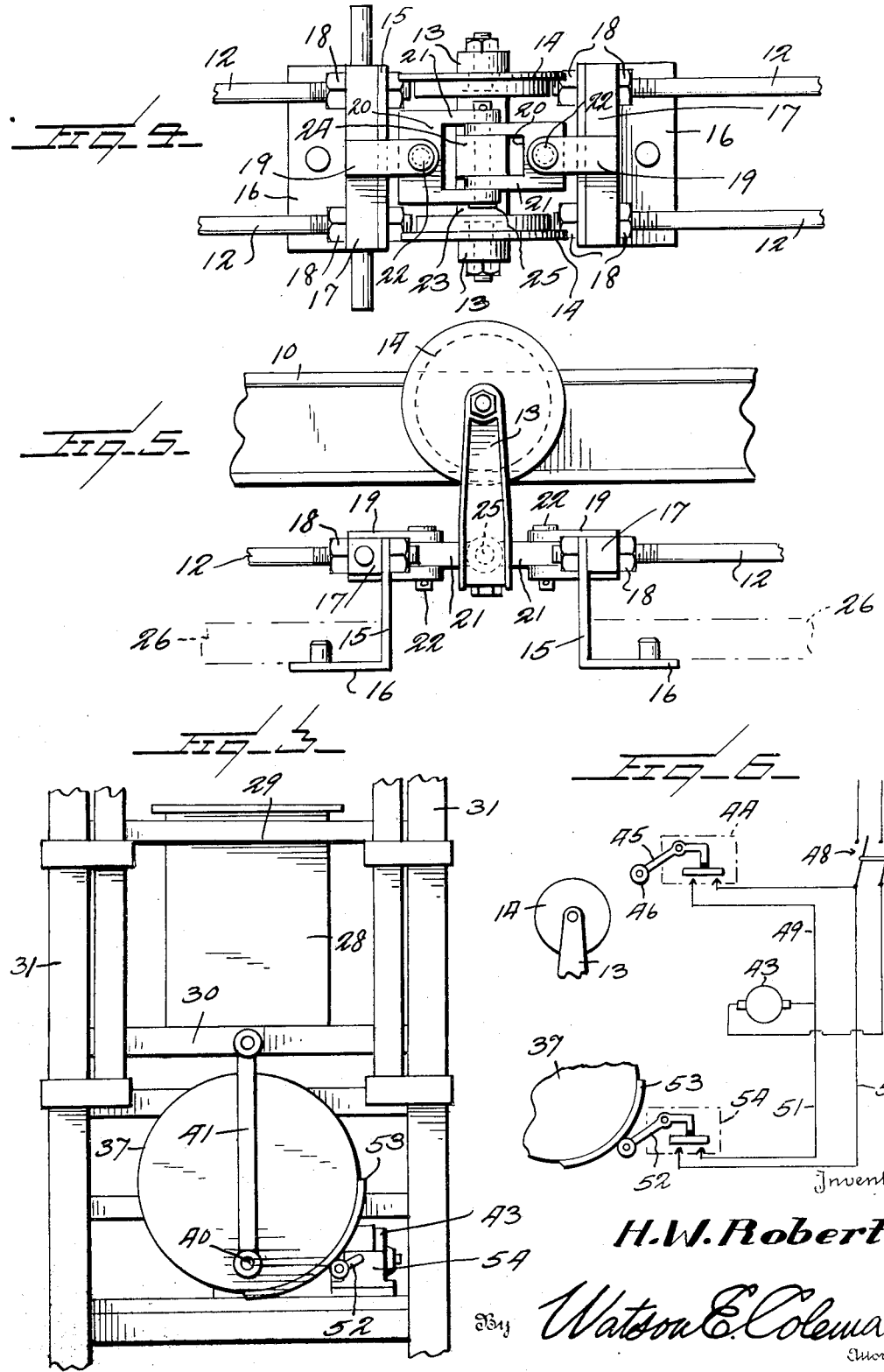

1,946,360

UNITED STATES PATENT OFFICE 1,946,360

DIPPING MACHINE

Harry W. Roberts, Trenton, N. J.

Application March 21, 1933. Serial No. 661,957

9 Claims. (Cl. 18—24)

This invention relates to machines for forming rubber articles such as finger cots and the like wherein a form is dipped into a solution of pure latex, the rubber dried on the form and the article stripped from the form and the invention particularly relates to means for dipping the article into the tank of latex. Heretofore in the formation of rubber articles of this character, the forms have generally been dipped by hand, but it has been proposed to have the forms, mounted upon form boards, travel over an endless track and have the track depressed immediately over a tank containing the rubber or latex so that the form boards will be lowered to carry the forms into the tank and then as they travel, carry the forms out of the tank. This construction is open to a number of objections. It involves the use of a relatively long tank within which the forms must travel and the traveling of the forms through the tank sets up currents and eddies in the liquid latex or rubber which causes one side of the form to be more deeply covered with rubber than the other side of the form, that is, the rubber article is thicker on one side than it is on the other and the deposit of rubber on the form is uneven.

It has also been proposed to provide means which acts to lower the form board into a tank of rubber while the endless carrier upon which the form boards are supported is stationary. This involves delay and requires relatively complicated mechanism to provide for the lowering of the forms into the tank.

The general object of the present invention is to provide a construction of this character wherein the forms are carried in an endless path upon an endless carrier, the carrier moving continuously at a fixed speed and provide a vertically movable tank which, while the carrier is still moving, rises to immerse the forms mounted on the carrier and then is depressed to its original position.

A further object is to provide automatic means for causing the elevation of the tank when a form board has arrived in a predetermined position relative to the tank and cause an automatic lowering of the tank.

Another object in this connection is to provide electrically operated means for driving the crank which raises and lowers the tank and provide automatically operated switches for connecting the motor with a source of current to raise the tank and again lower it and provide for cutting off the current to the motor as soon as the tank has arrived in its fully lowered position.

Other objects will appear in the course of the following description.

This invention is illustrated in the accompanying drawings, wherein:—

Figure 1 is a side elevation partly in section of a portion of an endless track and carrier with a sliding and dipping tank constructed in accordance with this invention;

Figure 2 is a section on the line 2—2 of Figure 1;

Figure 3 is a fragmentary elevation on the opposite side from the elevation shown in Figure 2;

Figure 4 is a fragmentary top plan view of one of the joints between the sections of the endless element;

Figure 5 is a side elevation thereof and showing the track;

Figure 6 is an electrical diagram illustrating the electric circuits of the motor and switches.

Referring to the drawings, 10 designates a T-shaped or double rail supported in any suitable hangers 11. It will be understood that this rail constitutes an endless track which may be circular or oval or have any other desired configuration. The endless nature of this track has not been shown as it seems to be obvious.

Operating in connection with this rail is an endless carrier comprising a plurality of longitudinally extending pairs of rods 12 operatively connected as will now be described to upwardly extending supports 13 upon which the wheels 14 are mounted, these wheels 14 being flanged and adapted to run upon the track 10.

This detailed construction is illustrated in Figures 4 and 5 and from these figures it will be seen that the rods 12 engage the upper ends of transversely extending form board racks designated 15. These form board racks are angular in form to provide an inwardly extending depending flange 16 upon which the form boards 26 rest. Each flange 15 of the form board rack carries at its upper end the transversely extending block 17 through which the threaded ends of the rods 12 pass, the rods 12 being provided with the nuts 18, one on each side of the block 17 and the flange 15 as shown in Figure 5. At the middle of each form board rack, there is provided the bifurcated yoke 19.

Disposed in the fork of each member 19 is a block 20 having the two parallel arms 21, the arms of one block extending into the space between the arms of the opposite block 20. Each block 20 is pivoted to its corresponding yoke 19 by means of a vertical pivot bolt or pin 22. The members 13 are attached to a transversely extending element 23 having an upwardly extending portion 24 disposed between the arms 21 and to which these arms are pivoted by means of a pivot pin 25. It will be seen that by this construction, each wheel supporting element constitutes a connection between the adjacent ends of pairs of rods 12, the connection being such that each pair of rods has pivotal engagement with the element 23 for movement in a horizontal plane and pivotal engagement with the element 23 for movement in a vertical plane, the pivot pins 22 permitting swinging movement of the joints of the endless conveyor in a horizontal plane and the pivot pins 25 permitting swinging movement in a vertical plane.

This construction permits the endless conveyor formed of the members 12 and the connecting members to pass around sprocket wheels or other wheels upon which the endless conveyor is mounted for continuous movement and permits this endless conveyor to follow the formation of the tracks 10.

The endless conveyor carries upon it the opposite pairs of form board racks designated generally 15, the lower flanges supporting the form boards 26. Each form board 26 carries upon it two rows of downwardly depending forms 27 which are ordinarily made of glass. The particular manner of forming these form boards and connecting the forms to the form board forms no part of the present invention and, therefore, is not illustrated in detail. It may be said, however, that these forms are ordinarily rotatably mounted upon the form boards so that the articles may be beaded automatically and the articles automatically slipped from the forms. At the time, however, when the form boards are disposed over the dipping tank to be described, the forms are stationary.

At one point in the extent of the track 10, there is disposed a vertically movable dipping tank 28. This dipping tank is mounted upon a sliding frame, the elements of which are designated 29 and 30, this frame operating in vertical guides 31, there being four of these guides and the guides being preferably of angle iron. Mounted upon this frame at the top of the guides, which guides extend above the rail 10, are two pairs of pulleys 32 and exteriorly of these pulleys are two pairs of pulleys 33 disposed below the pulleys 32.

Cables 34 are trained over the pulleys 32 and 33, each cable at its outer end being connected to a counter-weight 35, the counter-weight being formed of a plurality of sections so that the effective weight of the counter-weight may be changed and at its inner end, each cable 34 after passing over the pulley 32 extends downward and is connected to the sliding frame formed of the parts 29 and 30 previously described as the elevating frame. This elevating frame has rollers 36 which bear against the vertical guides 31. Thus the tank 28 is carried by a frame which moves in vertical guides and the weight of the tank and of the frame are counter-weighted by the counter-weights 35, these counter-weights being just sufficient to counter-balance the weight of these parts.

Each pair of pulleys 33 is preferably mounted upon a single shaft 33a as shown in Figure 1, though I do not wish to be limited to this.

The means for raising or lowering the tank includes two crank disks 37 mounted upon a transverse shaft 38 which carries upon it the worm wheel 39. The crank disks have wrist pins 40 operatively engaging the connecting rods 41 which extend upward and are pivotally engaged with the members 30 which support the tank 28. It will be seen that upon each complete rotation of the shaft 38, the tank will rise into the path of movement of the forms 27 and then be lowered to a position below the path of movement of the forms.

For the purpose of driving the shaft 38 with its worm wheel 39, I provide the worm shaft 42 which is driven by the electric motor 43. The motor 43 is automatically started as soon as the conveyor brings a form board into position above the tank, and it is automatically stopped as soon as the tank has been lifted and then returned to its original position. To this end, I provide a starting switch, the casing of which is designated 44. This starting switch is of a well-known type found on the market and ordinarily known as a limit switch. The casing is provided on one side with a switch arm 45 having a roller 46, the arm being normally urged downward by a spring so that the roller 46 is disposed in the path of movement of one of the supporting wheels 14. When the switch arm 45 is downward, the switch is open and the motor 43 is stopped. When the switch arm is raised, however, the motor is connected to the source of energy and remains so connected until the wheel 14 has passed the roller 46 when the switch arm again drops. It is during this period that the motor operates to raise and lower the tank. The wires from the switch box 44 pass out through the conduit 47 to a manually operable switch 48 whereby the mechanism may be cut off from the source of energy, then pass downward by wires 49 to a junction box from which they pass to the motor through a conduit.

Disposed in circuit with the motor and controlling its operation is a second "limit switch", the casing of which is designated 54 which is normally in an "off" position but which is urged to a position to connect the motor with the source of energy after one of the crank disks 37 has moved a predetermined amount. To this end, the crank disk 37 is shown as provided with a cam 53 which, as illustrated, extends through a quarter of a circle. Operating against this cam is the roller of arm 52 which is urged against the cam. The circuit through the motor may be connected up in a variety of different ways which will be obvious to electricians but in Figure 6 I illustrate diagrammatically one circuit for the motor.

As shown in Figure 6, the motor 43 has one of its leads connected to one of the contacts of switch 44 by wire 49, the other of its leads being connected by wire 49a to the switch 48. A wire 50 also leads from switch 48 to one of the contacts of a limit switch 54 of the same character as limit switch 44 while from the other contact of the limit switch 54, a wire 51 extends to one of the leads of the motor 43. The limit switch 54 has an arm 52 carrying a roller at its end which bears against a cam 53 mounted upon the crank disk 37. This cam 53 presses the arm inward to open the switch, the arm being resiliently urged outward by a spring. It will be seen that in this case, the switch operates reversely to the switch 44 and that when the switch arm is forced outward, the switch is closed. From the limit switch 54, the conductors 50 and 51 extend as previously described.

It will be seen that a circuit can be closed through the motor either through the switch 44 or through the switch 54. The switch 54 is held in its normally open position, breaking the circuit through the wires 50 by contact of the arm 52 with the cam 53, this cam being so disposed that the lower end of the cam is immediately beneath the wrist pin 40, when the tank is in its lowered position. With this construction as a wheel 14 reaches the arm 46 of the limit switch 44, it lifts this arm, closing the circuit through the wires 49 and 49a to the motor and starting the motor. The arm 46 remains raised until the wheel 14 has passed beyond it, whereupon the arm drops. During this period, the motor has rotated the crank disk 37 through approximately one-eighth of a revolution and the arm 52 has passed off of the cam 53, thus closing a circuit through the switch 54 and the wires 50 and 51 so that while the circuit is broken through the switch 44 it is closed through the switch 54.

The motor continues to rotate carrying the tank upward and then lowering the tank until the advanced edge of the cam 53 wedges the arm 52 outward, thus breaking the circuit through the motor. The motor will continue to rotate under its own inertia until the wrist pin 40 is in its lowered position.

It will be seen that the circuit is not broken by the cam 53 until the tank has moved down below the forms 27. It will thus be seen that the motor is automatically started as soon as a wheel 14 has reached and raised the switch arm 45 and that the motor must rotate through nearly an entire revolution before the motor is cut off. The speed of the motor and the speed of movement of the tank is so correlated with the speed of movement of the endless conveyor supporting the form boards that the speed of the endless conveyor is not checked or stopped during the period when the tank is rising and falling so that while the endless conveyor is not stopped in its forward movement, the forms do not touch or come in contact with the ends of the tank. Obviously, the particular circuit used for this purpose and the particular means for closing and opening the circuits through the motor may be modified without departing from the spirit of the invention as defined in the appended claims and equally obviously the particular form of the frame supporting and guiding the tank may be changed without departing from the spirit of the invention as so defined.

By this invention, I provide very simple and effective means for dipping forms into a tank of latex and withdrawing the forms and in actual practice, it has been found that this method of dipping secures uniform thickness of the skin of rubber or latex formed upon the forms.

By providing a plurality of these dipping stations each provided with its vertically movable tank, as the forms pass around the endless track, they can be dipped any desired number of times before the forms are removed. Of course, it will be understood that sufficient space must be left between the dipping stations as to secure a hardening of the rubber latex upon the forms after each dipping operation.

The form boards with the forms thereon are slipped into place in the form board carriers constituted by the flanges 15 by an operator standing at one point along the endless track and the form boards may be removed in the same manner. How the form boards are placed on the carriers and removed therefrom forms no part of this invention, however. After the forms have been dipped a pre-determined number of times, as for instance, twice, then the beads are rolled upon the articles by means which forms no part of this invention and then eventually the articles are automatically stripped from the forms but this forms no part of my present invention.

Obviously the mechanism might be modified in many ways without departing from the spirit of the invention as defined in the appended claims.

What is claimed is:—

1. A mechanism for forming rubber articles by dipping including a continuously moving carrier, form boards carried thereby and having forms depending therefrom, vertically movable guides disposed below one portion of the path of movement of the carrier, a liquid tank operatively supported within said guides for vertical motion and normally disposed below the path of movement of the form boards and forms, means counter-weighting the tank, means for elevating the tank to immerse the forms and then retracting the tank to its normal position including an electric motor, means actuated by the arrival of a form board above the tank energizing the motor, and means de-energizing the motor when the tank has made one complete reciprocation.

2. A mechanism for forming rubber articles by dipping including an endless track, an endless carrier supported by said track and constantly moving in one direction, the endless carrier including a longitudinal series of supporting wheels a series of form board supports and disposed between the wheels, form boards detachably supported upon said supports and having forms depending therefrom, a vertically movable tank disposed beneath one portion of the track and containing liquid into which the forms are to be dipped, means for raising and lowering said tank including a motor, means automatically actuated by the arrival of a form board above the tank and for energizing said motor, and means for automatically deenergizing the motor after the tank has made one reciprocation.

3. A mechanism for forming rubber articles by dipping including an endless track, an endless carrier having wheels engaging said track, the wheels being placed at spaced intervals, form board supports mounted on said carrier and disposed between the longitudinally spaced wheels, form boards detachably mounted on the supports and having depending forms, a tank disposed beneath the track at one point therein and mounted for vertical reciprocation, means for vertically reciprocating the tank including an electric motor, a switch automatically shifted to close a circuit through the motor when a form board has arrived in position above the tank to thereby cause the elevation of the tank in a position to dip articles into the liquid in the tank and the subsequent depression of the tank, and means acting to automatically break the circuit through the motor when the tank has reached its lowered position.

4. A mechanism for forming rubber articles by dipping including an endless track, a continually moving endless carrier having longitudinally spaced wheels engaging said track, the carrier having means for supporting a form board between each pair of wheels, form boards carried by said supporting means and having depending forms, a frame disposed at one point of the track and having vertical elements, a tank guided for vertical movement on said vertical elements of the frame, counter-weights for the tank, means for reciprocating the tank including an electric motor, a normally open switch disposed to be engaged by one of the wheels in advance of each form board and shifted thereby to a position to close the circuit through the motor to thus cause the elevation and depression of the tank, and means for automatically opening the circuit through the motor when the tank has lowered to its normal position below the forms.

5. A mechanism for forming rubber articles by dipping including an endless track comprising a T-shaped rail, an endless carrier having pairs of wheels disposed to engage said track on each side thereof, the pairs of wheels being spaced longitudinally with relation to each other, form board supports carried by the endless carrier below the track, form boards detachably mounted on the supports and having depending forms, a framework disposed in the length of said track and having vertical elements, a vertically movable tank, a support therefor having sliding engagement with the vertical elements and guided thereby, means for moving said tank and support including a shaft, crank disks carried thereby and connecting rods between the crank disks and the support and tank, an electric motor operatively geared to said shaft, a normally open switch disposed in the path of said track engaging wheels and when engaged by a wheel in advance of a form board support closing a circuit through the motor, and means acting automatically when the tank has been raised and then depressed to break the circuit through the motor when the tank has reached a position below the forms.

6. A mechanism for forming rubber articles by dipping including an endless track comprising a T-shaped rail, an endless carrier having pairs of wheels disposed to engage said track on each side thereof, the pairs of wheels being spaced longitudinally with relation to each other, form board supports carried by the endless carrier below the track, form boards detachably mounted on the supports and having depending forms, a framework disposed in the length of said track and having vertical elements, a vertically movable tank, a support therefor having sliding engagement with the vertical elements and guided thereby, means for moving said tank and support including a shaft, crank disks carried thereby and connecting rods between the crank disks and the support and tank, an electric motor operatively geared to said shaft, a normally open switch disposed in the path of said track engaging wheels and when engaged by a wheel in advance of a form board support closing a circuit through the motor, and means acting automatically when the tank has been raised and then depressed to break the circuit through the motor when the tank has reached a position below the forms, including a second switch controlling the circuit through the motor normally urged to a circuit closing position, and a cam operatively carried by the shaft and shifting said switch to a circuit breaking position when the tank has been lowered.

7. A mechanism for forming rubber articles by dipping including an endless track comprising a T-shaped rail, an endless carrier having pairs of wheels disposed to engage said track on each side thereof, the pairs of wheels being spaced longitudinally with relation to each other, form board supports carried by the endless carrier below the track, form boards detachably mounted on the supports and having depending forms, a framework disposed in the length of said track and having vertical elements, a vertically movable tank, a support therefor having sliding engagement with the vertical elements and guided thereby, means for moving said tank and support including a shaft, crank disks carried thereby and connecting rods between the crank disks and the support and tank, an electric motor operatively geared to said shaft, a normally open switch disposed in the path of said track engaging wheels and when engaged by a wheel in advance of a form board support closing a circuit through the motor, and means acting automatically when the tank has been raised and then depressed to break the circuit through the motor when the tank has reached a position below the forms including a second switch controlling the circuit motor and normally urged to a circuit closing position, and a cam carried by one of the crank disks and disposed to engage said switch and open it as the tank nears its fully lowered position.

8. A machine for forming rubber articles by dipping including an endless track, T-shaped in cross section, a constantly moving endless carrier having pairs of wheels, the wheels of each pair engaging the track at opposite sides thereof, the carrier being formed of sections joined to each other for vertical and transverse swinging movement, angular form board supports carried by the carrier and disposed between the longitudinally spaced pairs of wheels, form boards detachably mounted on said supports and having depending forms, a framework disposed in the length of said track and including vertical members, a tank, a support for the tank having sliding engagement with the vertical members, means for raising or lowering the tank including a shaft, cranks thereon operatively connected to the tank and its support, an electric motor for driving said shaft, a switch disposed in the path of movement of the wheels and actuated by the engagement with a wheel in advance of a form board support to close a circuit through the motor to thus cause the elevation and depression of the tank, and means for breaking the circuit through the motor when the tank has lowered below the forms.

9. A mechanism for forming rubber articles by dipping including an endless track, an endless carrier supported by said track and constantly moving in one direction, the endless carrier including a series of wheels engaging the track, a series of form board supports disposed between the wheels, form boards detachably supported upon said supports and having forms depending therefrom, a vertically movable tank disposed beneath one portion of the track and containing liquid within which the forms are to be dipped, a wheel having a wrist pin, a connecting rod engaging with the wrist pin and operatively engaged with the tank, an electric motor operatively engaged with said wheel to drive it, and means automatically actuated by the arrival of a form board above the tank for energizing the motor, and means for automatically de-energizing the motor after the tank has made one reciprocation.

HARRY W. ROBERTS.